(12) United States Patent
Hong et al.

(10) Patent No.: US 9,916,694 B2
(45) Date of Patent: Mar. 13, 2018

(54) METHOD FOR HOLE FILLING IN 3D MODEL, AND RECORDING MEDIUM AND APPARATUS FOR PERFORMING THE SAME

(71) Applicant: Foundation of Soongsil University-Industry Cooperation, Seoul (KR)

(72) Inventors: Min-Cheol Hong, Seoul (KR); Beomsu Kim, Seoul (KR); Tien-Dat Nguyen, Seoul (KR); Huu-Noi Doan, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 35 days.

(21) Appl. No.: 15/189,674

(22) Filed: Jun. 22, 2016

(65) Prior Publication Data
US 2017/0263057 A1    Sep. 14, 2017

(30) Foreign Application Priority Data

Mar. 8, 2016  (KR) .......................... 10-2016-0027719

(51) Int. Cl.
*G06T 19/20* (2011.01)
*H04N 5/222* (2006.01)
(Continued)

(52) U.S. Cl.
CPC ............ *G06T 19/20* (2013.01); *G06T 3/0093* (2013.01); *G06T 19/006* (2013.01);
(Continued)

(58) Field of Classification Search
CPC ........... H04N 13/0011; H04N 13/0022; H04N 13/0275; H04N 2213/003; G06T 19/20; G06T 3/0093
See application file for complete search history.

(56) References Cited

U.S. PATENT DOCUMENTS

2008/0319723 A1*  12/2008  Smith .................... G06T 17/05
                                                               703/2

FOREIGN PATENT DOCUMENTS

KR   10-2011-0066609 A   6/2011
KR   10-2012-0026662 A   3/2012
(Continued)

OTHER PUBLICATIONS

Sun, Wenxiu, et al. "Novel temporal domain hole filling based on background modeling for view synthesis." Image Processing (ICIP), 2012 19th IEEE International Conference On. IEEE, 2012.*
Yao, Chao, et al. "Depth map driven hole filling algorithm exploiting temporal correlation information." IEEE Transactions on Broadcasting 60.2 (2014): 394-404.*
(Continued)

*Primary Examiner* — Daniel Hajnik
(74) *Attorney, Agent, or Firm* — Sang Ho Lee; Novick, Kim & Lee, PLLC

(57) ABSTRACT

Disclosed is a method for hole-filling in 3D models. The method includes extracting static background information from a current frame of an input image and extracting virtual static background information using the static background information, warping a color image and a depth map of the current frame to acquire a virtual image and a virtual depth map, and labeling a hole area formed in the virtual depth map to extract local background information, performing a first hole-filling onto the virtual image and the virtual depth map using a similarity between the virtual static background information and the local background information, and performing a second hole-filling with respect to remaining holes after the first hole-filling in a manner of an exemplar-based in-painting method to which a priority function including a depth term is applied.

9 Claims, 14 Drawing Sheets

(51) Int. Cl.
*G06T 3/00* (2006.01)
*G06T 7/194* (2017.01)
*G06T 19/00* (2011.01)

(52) U.S. Cl.
CPC ........... *H04N 5/2226* (2013.01); *G06T 7/194* (2017.01); *G06T 2219/2021* (2013.01)

(56) References Cited

FOREIGN PATENT DOCUMENTS

| KR | 10-2013-0001869 A | 1/2013 |
| KR | 10-2013-0067474 A | 6/2013 |
| KR | 10-2014-0051035 A | 4/2014 |

OTHER PUBLICATIONS

Fernandez-Sanchez, Enrique J., Javier Diaz, and Eduardo Ros. "Background subtraction based on color and depth using active sensors." Sensors 13.7 (2013): 8895-8915.*

Murgia, Julian, Cyril Meurie, and Yassine Ruichek. "An improved colorimetric invariants and RGB-depth-based codebook model for background subtraction using kinect." Mexican International Conference on Artificial Intelligence. Springer, Cham, 2014.*

Martin Koppel et al., Depth Image-Based Rendering with Spatio—Temporally Consistent Texture Synthesis for 3-D Video with Global Motion, Image Communications Group, 2012, pp. 2713-2716.

Huu-Noi Doan "A Spatial-Temporal Hole Filling Approach with Background Modeling and Texture Synthesis for 3D Video", Thesis for the Degree of Master, Department of Information and Telecommunication, Graduate School of Soongsil University, Jun. 2015.

* cited by examiner

Algorithm 1: Create codebook step 1: Initial codebook model is configured as follows. $C \leftarrow \varnothing$ (empty set) at the time $t_0$ and $L = 0$ ($L$: codebook length).

step 2: Brightness of any pixel $x_t = (p, d) = (R, G, B, d)$ is defined as $I = R + G + B$.
Codeword satisfying the following three conditions is determined among codewords of a codebook $C = \{c_i \mid 1 \leq i \leq L\}$.

(a) $colordist(p, \bar{p}_i) \leq \epsilon_1$, (b) $brightness(I, aux_i) = True$, (c) $disparity(d, aux_i) = True$ step 3: When there is no codeword satisfying the three conditions of step 2, new codeword is created as follows.

$L \leftarrow L + 1$ $u_L \leftarrow (R, G, B, d)$, $aux_L \leftarrow (I, I, d, d, 1)$.

When there is a codeword satisfying the three conditions of step 2, corresponding codeword is updated as follows.

$$u_i \leftarrow \left( \frac{f_i \bar{R}_i + R}{f_i + 1}, \frac{f_i \bar{G}_i + G}{f_i + 1}, \frac{f_i \bar{B}_i + B}{f_i + 1}, \frac{f_i \bar{d}_i + d}{f_i + 1} \right),$$

$aux_i \leftarrow (\min(I, I_{i,\min}), \max(I, I_{i,\max}),$
$\min(d, d_{i,\min}), \max(d, d_{i,\max}), f_i + 1)$.

step 4: In next frame, codebook $C$ is updated by repeatedly performing step 2.

FIG. 3

Algorithm 2: Extract temporary background information step 1: For $x_i = (p, d) = (R, G, B, d)$, perform the next function on each codeword of background codebook $C_{BG}$ of Equation 4.

(a) $T_1 = colordist(p, \bar{p}_m)$, (b) $T_2 = brightness(I aux_m)$, (c) $T_3 = disparity(d, aux_m)$, (d) $T_c = (T_1 \leq \epsilon_1 \vee (\epsilon_1 < T_1 \leq \epsilon_2 \wedge T_3)) \wedge T_2 \wedge T_3$ step 2: When $T_c$ is false, corresponding pixel is defined as hole pixel in temporary background image $$TF_{BG}^t(i,j) = 0, TM_{BG}^t(i,j) = 0$$

When $T_c$ is true, corresponding pixel is defined as non-hole pixel in temporary background image $$TF_{BG}^t(i,j) = p, TM_{BG}^t(i,j) = d$$

FIG. 4

Algorithm 3: Update static background information step 1: When any pixel of temporary background information is not hole pixel, static background information is updated as follows.

$$F_{BG}^t(i,j) = TF_{BG}^t(i,j), M_{BG}^t(i,j) = TM_{BG}^t(i,j).$$

When pixel is hole pixel, the following function is performed on depth value of static background information of preceding frames.

$$T_4 = disparity(M_{BG}^{t-1}(i,j), aux_m),$$
$$where\ c_m = (\bar{p}_m, aux_m) \in C_{BG}^t.$$

step 2: When $T_4$ is true, static background information of current frame is updated by preceding frame information as follows.

$$F_{BG}^t(i,j) = F_{BG}^{t-1}(i,j), M_{BG}^t(i,j) = M_{BG}^{t-1}(i,j)$$

When $T_4$ is false, the current pixel is replaced with hole value of temporary background information.

```
Algorithm 4: Label hole pixel
step 1: S←∅ (empty set), Q←∅, ∀M(i,j)∈Ωₖ.
step 2: Q←VM(i,j)
step 3: While Q ≠ ∅ do
        Q→n(i,j)
        if n(i,j) = 0 then
           n(i,j) = 1
           S←n(i,j)
           if n(i±1,j±1) = 0 then
              Q←n(i±1,j±1)
        return S.
```

Algorithm 5: Exemplar-based hole-filling in which priority function is applied step 1: Priority of window $\Psi_p$ with size of U×V having boundary area pixel p = $VF_{update}^t$(i, j) as center as shown in FIG. 8.

$$Pri(p) = C(p)D(p)Z(d)$$

(d: the corresponding depth value of $VM_{filled}^t$)

step 2: Hole-filling process is performed according to priority. Hole area set and non-hole area set are defined for patch $\Psi_q$ with size of U×V having boundary pixel $q_1$ = $VF_{hole}^t$(i, j) as center, as follows.

$$\Phi_q = \{q_1, \cdots, q_k\}, \Omega_q = \{q_{k+1}, \cdots, q_{U \times V}\},$$
$$\Psi_q = \Phi_q \cup \Omega_q.$$

step 3: Reference patch that is the most similar to $\Psi_q$ is determined to minimize the following energy function.

$$E = \sum_{i=1}^{k} \|q_i - r_i\|^2 + \omega \sum_{j=k+1}^{U \times V} \|q_j - r_j\|^2.$$

($r_i, r_j$: Hole and non-hole color pixel corresponding to reference patch)

step 4: Hole pixels of $VF_{update}^t$ are replaced with pixels corresponding to the most similar patch as shown in FIG. 9 step 5: Boundary pixels of $F_k$ in $VF_{update}^t$ are updated step 6: Step 1 is repeated until all hole pixels of $F_k$ are filled.

FIG. 12

METHOD FOR HOLE FILLING IN 3D MODEL, AND RECORDING MEDIUM AND APPARATUS FOR PERFORMING THE SAME

CROSS-REFERENCE TO RELATED APPLICATION

This application claims priority to and the benefit of Korean Patent Application No. 10-2016-0027719, filed on Mar. 8, 2016, the disclosure of which is incorporated herein by reference in its entirety.

BACKGROUND

The present disclosure relates to a method for hole-filling in 3D models and a recording medium and apparatus for performing the same, and more particularly, to a method for hole-filling in 3D models that fills a hole area created while a virtual-viewpoint image is composed from single-viewpoint images, and a recording medium and apparatus for performing the same.

Due to the industrial and academic development in the three-dimensional (3D) video field, much research has been conducted on various system and display devices that provide 3D content. In addition, research has also been conducted on a system and display device that enables a user to feel virtual reality without additional devices, such as 3D glasses.

For this, a method for composing a virtual-viewpoint image through depth-image-based rendering in which the virtual-viewpoint image is composed using actual viewpoint images has been proposed. Depth-image-based rendering uses 3D warping, and thus holes are created in the virtual-viewpoint image. In this case, a small hole is created due to an estimation error of a depth value, while a large hole is created by an area exposed in an actual viewpoint image being hidden in a virtual-viewpoint image.

An interpolation method and an in-painting method have been proposed as a representative method of filling the holes. However, according to the interpolation method, geometric distortion and blurring occur along a boundary between a background area and a foreground area, and the blurring becomes more severe as the hole area increases in size.

On the other hand, the in-painting method is classified into a structure-based method and an exemplar-based method. The structure-based method has more improved properties than the interpolation method because the structure-based method effectively preserves structural elements. However, when the hole area is large, the structural elements are spread, and thus detailed information is lost. It has been demonstrated that the exemplar-based method fills the hole area with pixels copied from a neighbor patch, and achieves an enhanced result when compared to other methods including the structure-based in-painting method. Thus, research has been conducted on various modification techniques on the basis of the exemplar-based method.

Representative examples include a method of using an image registration pattern of continuous frames to update viewpoint composition, a method of temporarily merging extracted static scenes into a virtual viewpoint, etc. According to the methods, static background pixels can be successfully obtained when a foreground object has a high activity. As the activity of the foreground object decreases, the number of remaining foreground pixels increases, and thus geometric distortion and blurring still occur. Furthermore, temporal static information regarding hole pixels may be estimated from other frames through a codebook process upon viewpoint composition of a 3D video. However, the methods have a significant error in estimating a static environment that exists for a short time and are sensitive to noise positioned at a boundary of the foreground object.

Thus, more research is needed on new techniques for a method for hole-filling in 3D models based on an exemplar-based method.

SUMMARY OF THE DISCLOSURE

The present disclosure is directed to a method for hole-filling in 3D models, and a recording medium and apparatus for performing the same, and provides a method for hole-filling in 3D models for estimating static reliable background information and local background information, performing a hole-filling process on the basis of the information, applying an exemplar-based in-painting method according to a priority function including a depth term, and performing a hole-filling process on the remaining holes, and a recording medium and apparatus for performing the same.

According to an aspect of the present disclosure, there is provided a method for hole-filling in 3D models that is performed on a hole area created while a virtual-viewpoint image is composed from an input image including a color image for each frame and depth map information corresponding to the color image, the method for hole-filling in 3D models including: extracting static background information for a current frame of the input image and extracting virtual static background information using the extracted static background information; warping a color image and a depth map for the current frame to acquire a virtual image and a virtual depth map and labeling a hole area formed in the virtual depth map to extract local background information; and performing primary hole-filling on the virtual image and the virtual depth map using similarity between the virtual static background information and the local background information and performing secondary hole-filling in an exemplar-based in-painting method in which a priority function including a depth term is applied to the remaining holes after the primary hole-filling.

The extracting of static background information for a current frame of the input image and the extracting of virtual static background information using the extracted static background information may include creating a codebook using the color image for each frame of the input image and the depth map information corresponding to the color image, classifying codewords of the codebook into a background codeword and a foreground codeword, and extracting a background codebook for a background area of the input image.

The extracting of static background information for a current frame of the input image and the extracting of virtual static background information using the extracted static background information may include extracting a background image of the current frame of the input image and a background depth map corresponding to the background image using the background codebook as temporary background information and extracting static background information including a static background image and a static depth map for the current frame by updating the temporary background information using background information of preceding frames.

The extracting of static background information for a current frame of the input image and the extracting of virtual static background information using the extracted static background information may include warping the static background image and the static depth map to extract the virtual static background information including a virtual static background image and a virtual static background depth map corresponding to the virtual static background image.

The labeling of a hole area formed in the virtual depth map to extract local background information may include extracting the local background information by labeling a rectangular area including the hole area formed in the virtual depth map, identifying a background pixel and a foreground pixel according to depth information of the labeled rectangular area to acquire a local background depth value, and filling an area identified as the foreground pixel of the rectangular area with the local background depth value.

The performing of primary hole-filling on the virtual image and the virtual depth map using similarity between the virtual static background information and the local background information may include updating the virtual image and the virtual depth map using the virtual static background information corresponding to a pixel positioned within a certain range from a pixel corresponding to the local background information.

The performing of secondary hole-filling in an exemplar-based in-painting method in which a priority function including a depth term is applied to the remaining holes after the primary hole-filling may include labeling the remaining hole pixels in the updated virtual image and virtual depth map and performing the secondary hole-filling in the exemplar-based in-painting method while moving from a smallest hole area to a largest hole area according to a result of the labeling.

According to another aspect of the present disclosure, there is provided a non-transitory computer-readable recording medium having recorded thereon a computer program for performing the method for hole-filling in 3D models.

According to still another aspect of the present disclosure, there is provided an apparatus for hole-filing in 3D models for performing hole-filling on a hole area created while a virtual-viewpoint image is composed from an input image including a color image for each frame and depth map information corresponding to the color image, the apparatus for hole-filing in 3D models including: a static background information extraction unit configured to extract static background information for a current frame of the input image and extract virtual static background information using the extracted static background information; a local background information extraction unit configured to warp a color image and a depth map for the current frame to acquire a virtual image and a virtual depth map and label a hole area formed in the virtual depth map to extract local background information; and a hole-filling unit configured to perform primary hole-filling on the virtual image and the virtual depth map using similarity between the virtual static background information and the local background information and perform secondary hole-filling in an exemplar-based in-painting method in which a priority function including a depth term is applied to the remaining holes after the primary hole-filling.

The static background information extraction unit may create a codebook using the color image for each frame of the input image and the depth map information corresponding to the color image, classify codewords of the codebook into a background codeword and a foreground codeword, and extract a background codebook for a background area of the input image.

The static background information extraction unit may extract a background image of the current frame of the input image and a background depth map corresponding to the background image using the background codebook as temporary background information and extract static background information including a static background image and a static depth map for the current frame by updating the temporary background information using background information of preceding frames.

The static background information extraction unit may warp the static background image and the static depth map to extract the virtual static background information including a virtual static background image and a virtual static background depth map corresponding to the virtual static background image.

The local background information extraction unit may extract the local background information by labeling a rectangular area including the hole area formed in the virtual depth map, identifying a background pixel and a foreground pixel according to depth information of the labeled rectangular area to acquire a local background depth value, and filling an area identified as the foreground pixel of the rectangular area with the local background depth value.

The hole-filling unit may update the virtual image and the virtual depth map using the virtual static background information corresponding to a pixel positioned within a certain range from a pixel corresponding to the local background information.

The hole-filling unit may label the remaining hole pixels in the updated virtual image and virtual depth map and perform the secondary hole-filling in the exemplar-based in-painting method while moving from a smallest hole area to a largest hole area according to a result of the labeling.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 3 to 5 show an algorithm used by the static background information extraction unit to extract static background information;

FIG. 12 shows an algorithm used by the hole-filling unit to perform secondary hole-filling.

DETAILED DESCRIPTION OF EXEMPLARY EMBODIMENTS

Figure 1:
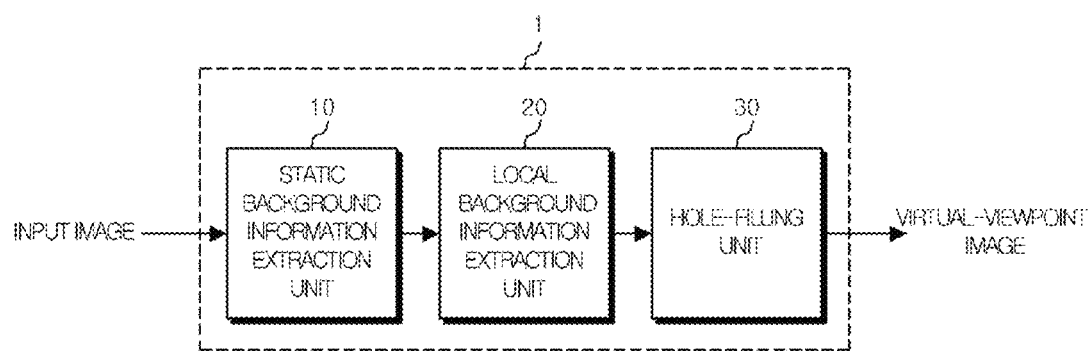
FIG. 1 is a control block diagram of an apparatus for hole-filing in 3D models according to an embodiment of the present disclosure.

In the following detailed description, reference is made to the accompanying drawings, which show specific embodiments in which the disclosure may be practiced. These embodiments will be described in sufficient detail to enable those skilled in the art to practice the present disclosure. It should be understood that the various embodiments of the present disclosure, although different, are not necessarily mutually exclusive. For example, a particular feature, structure or characteristic described herein in connection with one embodiment may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar elements throughout several views.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. For example, the following discussion contains a non-exhaustive list of definitions of several specific terms used in this disclosure (other terms may be defined or clarified in a definitional manner elsewhere herein). These definitions are intended to clarify the meanings of the terms used herein.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood to be open-ended, i.e., to mean including but not limited to.

Hereinafter, preferred embodiments of the present disclosure will be described in more detail with reference to the accompanying drawings.

FIG. 1 is a control block diagram of an apparatus for hole-filing in 3D models according to an embodiment of the present disclosure.

Referring to FIG. 1, an apparatus for hole-filing in 3D models 1 according to an embodiment of the present disclosure may include a static background information extraction unit 10, a local background information extraction unit 20, and a hole-filling unit 30. The apparatus for hole-filing in 3D models 1 according to an embodiment of the present disclosure may compose a virtual-viewpoint image from single-viewpoint images, and output the composed virtual-viewpoint image. In this case, the apparatus for hole-filing in 3D models 1 according to an embodiment of the present disclosure may estimate spatio-temporal background information and perform a hole-filling process on a hole area that occurs in the virtual-viewpoint image using the estimated spatio-temporal background information. The apparatus for hole-filing in 3D models 1 according to an embodiment of the present disclosure may be implemented by more or fewer elements than those shown in FIG. 1. The above-elements will be described in detail below.

The static background information extraction unit 10 may extract static background information on a specific frame of an input image and extract virtual static environment information using the extracted static background information. This will be described with reference to FIGS. 2 to 6D.

Figure 2:
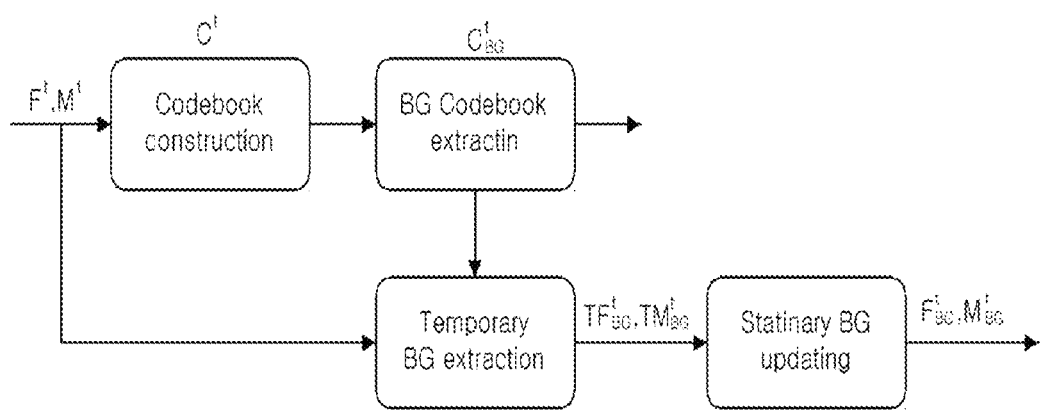
FIG. 2 is a flowchart showing a method of extracting static background information using a static background information extraction unit.

FIG. 2 is a flowchart showing a method of extracting static background information using a static background information extraction unit, FIGS. 3 to 5 show an algorithm used by the static background information extraction unit to extract static background information, and FIGS. 6A-6D show an example of extracting the static background information using the static background information extraction unit.

Referring to FIG. 2, first, the static background information extraction unit 10 may generate a codebook $C^t$ using a color image $F^t$ for each frame of an input image and depth map information $M^t$ corresponding to the color image $F^t$. In this case, the apparatus for hole-filing in 3D models 1 according to an embodiment of the present disclosure may receive an image including a color image $F^t$ for each frame and depth map information $M^t$ corresponding to the color image $F^t$ as the input image. In addition, the static background information extraction unit 10 may extract a background codebook $C^t_{BG}$ from the generated codebook $C^t$. Then, the static background information extraction unit 10 may extract background information including a background image and a background depth map for the current frame using the background codebook $C^t_{BG}$ as temporary background information $TF^t_{BG}$, $TM^t_{BG}$. Lastly, the static background information extraction unit 10 may extract static background information $F^t_{BG}$, $M^t_{BG}$ for the current frame by updating the temporary background information $TF^t_{BG}$, $TM^t_{BG}$ using background information of the preceding frame.

Specifically, in order to generate the codebook $C^t$, the static background information extraction unit 10 may form a training set X having N pixels of the preceding frame with respect to the color image $F^t$ and the depth map $M^t$ of the current frame as expressed in Equation 1 below.

$$X=\{x_1,x_2,x_3,\ldots,x_n\}=\{(p_1,d_1),\ldots,(p_N,d_N)\}, \quad \text{[Equation 1]}$$

where $p_n=\{R_n, G_n, B_n\}$ denotes an RGB vector, and $d_n$ denotes a depth value of a corresponding pixel.

The static background information extraction unit 10 may generate the codebook $C^t$ on the basis of the training set X. When the codebook $C^t$ has L codewords and is expressed as $C=\{c_1, c_2, c_3, \ldots, c_L\}$, an L-th codeword may be composed of a vector $\bar{x}_l=(\bar{p}_l,\bar{d}_l)=(\bar{R}_l,\bar{G}_l,\bar{B}_l,\bar{d}_l)$ and $aux_1=(I_{1,min},I_{1,max},D_{1,min},D_{1,max},f_l)$ having five elements. In this case, $\bar{R}_l,\bar{G}_l,\bar{B}_l$ are average color channel values, $\bar{d}_l$ is an average depth value, $I_{1,min}$ is a minimum brightness, $I_{1,max}$ is a maximum brightness, $D_{1,min}$ is a minimum depth value, $D_{1,max}$ is a maximum depth value, and $f_l$ is an occurrence frequency of the codeword.

The static background information extraction unit 10 may generate the codebook using the algorithm of FIG. 3 when the training set X is formed as described above. In FIG. 3, "←" denotes an operator used to add one element to the end of a queue, color distortion (colordist), brightness, and disparity similarity may be used to determine a codeword corresponding to any pixel, and each function may be defined as expressed in Equations 2 to 4 below.

$$colordist(p, \overline{p_l}) = \sqrt{\|p\|^2 - h^2}, \quad \text{[Equation 2]}$$

$$h^2 = \|p\|^2\cos^2\theta = \frac{\langle p, \overline{p_l}\rangle}{\|\overline{p_l}\|^2},$$

$$brightness(I, aux_l) = \begin{cases} True & if\ I_{low} \le I \le I_{hi} \\ False & otherwise \end{cases}, \quad \text{[Equation 3]}$$

$$I_{low} = \alpha I_{l,max},$$

$$I_{hi} = \min\left(\beta I_{l,max}, \frac{I_{l,min}}{\alpha}\right), \alpha < 1, \beta > 1,$$

$$disparity(d, aux_l) = \begin{cases} True & if\ d_{low} \le d \le d_{hi} \\ False & otherwise \end{cases}, \quad \text{[Equation 4]}$$

$$d_{low} = \alpha d_{l,max},$$

$$d_{hi} = \min\left(\beta d_{l,max}, \frac{d_{l,min}}{\alpha}\right), \alpha < 1, \beta > 1.$$

When the codebook is generated, the static background information extraction unit 10 may extract the background codebook $C^t_{BG}$ for a background area of the input image as expressed in Equation 5 by classifying the codeword into a background codeword and a foreground codeword using a k-means cluster. In this case, when there is one list of codewords for an arbitrary pixel, the static background information extraction unit 10 may classify the codeword as the background codeword.

$$C_{BG}^t=\{c_m \in BG | 1 \le m \le M\},$$

$$C^t=(C_{BG}^t \cup C_{FG}^t),(C_{BG}^t \cap C_{FG}^t)=\emptyset \quad \text{[Equation 5]}$$

When the background codebook $C^t_{BG}$ is extracted, the static background information extraction unit 10 may make each pixel in the current frame correspond to the background codebook $C^t_{BG}$ to extract background information including a background image of the current frame and a depth map corresponding to the background image. In this case, pixels corresponding to the foreground area may be defined as a hole area according to the background information of the current frame, which is extracted by the static background information extraction unit 10. Accordingly, the static background information extraction unit 10 may compensate for information on a background area corresponding to the foreground area using background information of preceding frames. For this, the static background information extraction unit 10 may accumulate and store background area information for each frame of the input image and define background information extracted from the current frame using the algorithm of FIG. 4 as a temporary background image $TF^t_{BG}$ and temporary background information of a temporary depth map $TM^t_{BG}$ corresponding to the temporary background image $TF^t_{BG}$. Lastly, the static background information extraction unit 10 may extract static background information including a static background image $F^t_{BG}$ and a static depth map $M^t_{BG}$ by updating the temporary background information including the temporary background information $TF^t_{BG}$, $TM^t_{BG}$ in consideration of background information $F^{t-1}_{BG}$, $M^{t-1}_{BG}$ of preceding frames according to the algorithm of FIG. 5. In this case, in FIG. 4, $\epsilon_1$ and $\epsilon_2$ denote thresholds, and operators "^" and "v" denote "OR" and "AND," respectively.

Figure 6A:
FIGS. 6A-6D show an example of extracting the static background information using the static background information extraction unit.
Figure 6B:
Figure 6C:
Figure 6D:
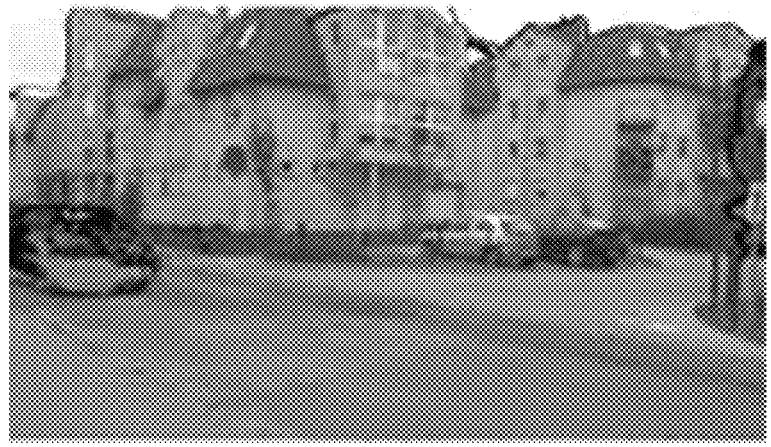

FIG. 6A shows an example of a background image of an original frame, and FIGS. 6B and 6C show an example of an image in which static background information is extracted from the original frame according to a conventional method. It can be seen from FIGS. 6B and 6C that a plurality of hole pixels are created in background pixels because the background codebook is extracted from the codebook, and background information of the current frame is not updated with background information of preceding frames. However, FIG. 6D shows an example of an image obtained by extracting static background information using the static background information extraction unit 10. More accurate static background information of the current frame may be extracted by compensating for hole pixels in the current frame using the background information of preceding frames.

Lastly, the static background information extraction unit 10 may acquire a virtual static background image $VF^t_{BG}$ and a virtual static background depth map $VM^t_{BG}$ corresponding to the virtual static background image $VF^t_{BG}$ by warping the extracted static background image $F^t_{BG}$ and static background depth map $M^t_{BG}$.

The local background information extraction unit 20 may warp the color image $F^t$ in the current frame and the corresponding depth map $M^t$ to acquire a virtual image $VF^t$ and a virtual depth map $VM^t$. In this case, the local background information extraction unit 20 may label a hidden area formed in the virtual depth map $VM^t$, that is, a hole area, to extract local background information. This will be described with reference to FIGS. 7 to 10C.

Figures 7, 8:
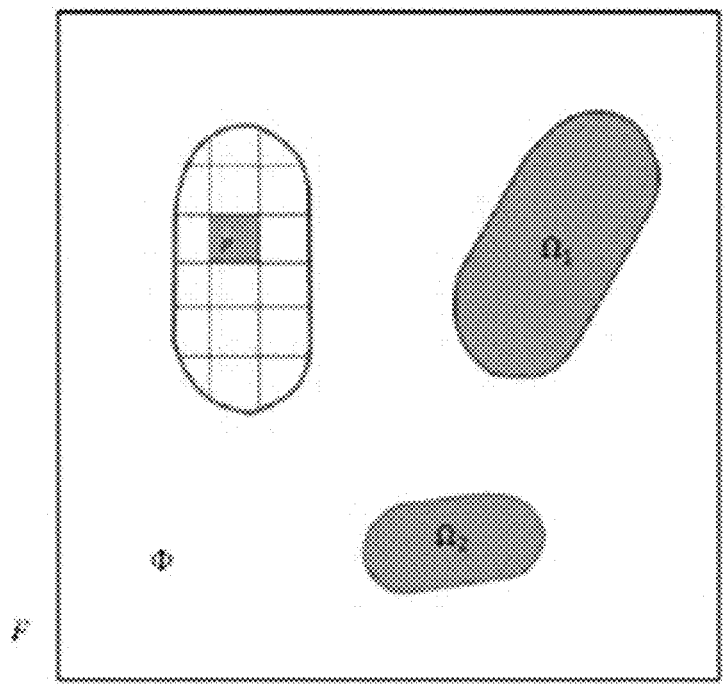
FIG. 7 shows an example of labeling a hole pixel area in a local background information extraction unit.
FIG. 8 shows an algorithm used to label a hole pixel area in the local background information extraction unit.
Figure 9A:
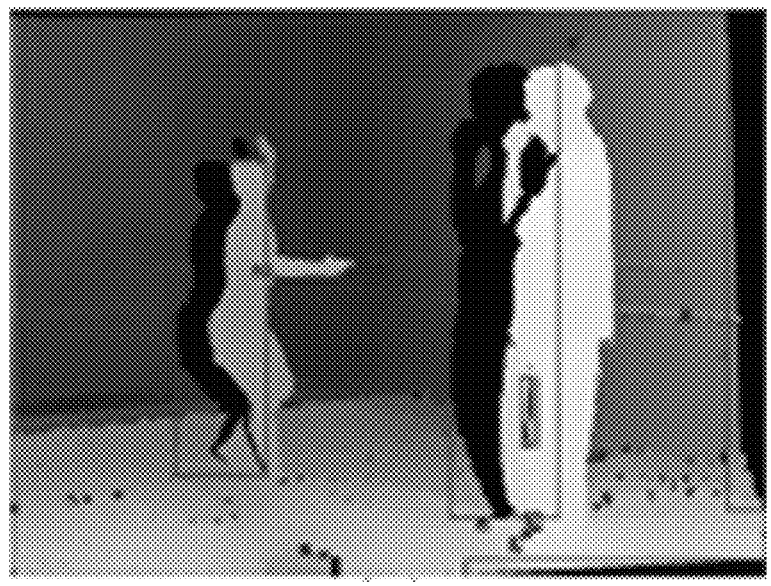
FIGS. 9A-9D show an example of a result of labeling a hole pixel area in the local background information extraction unit.
Figure 9B:
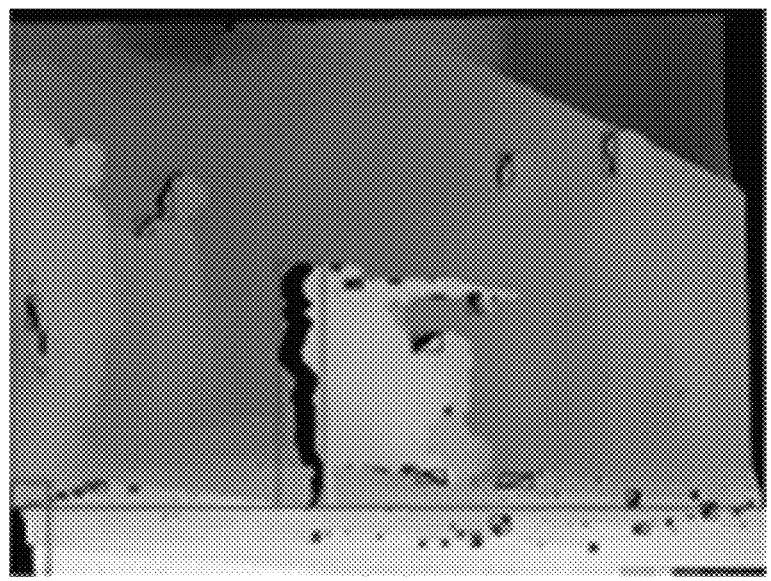
Figure 9C:
Figure 9D:
Figure 10A:
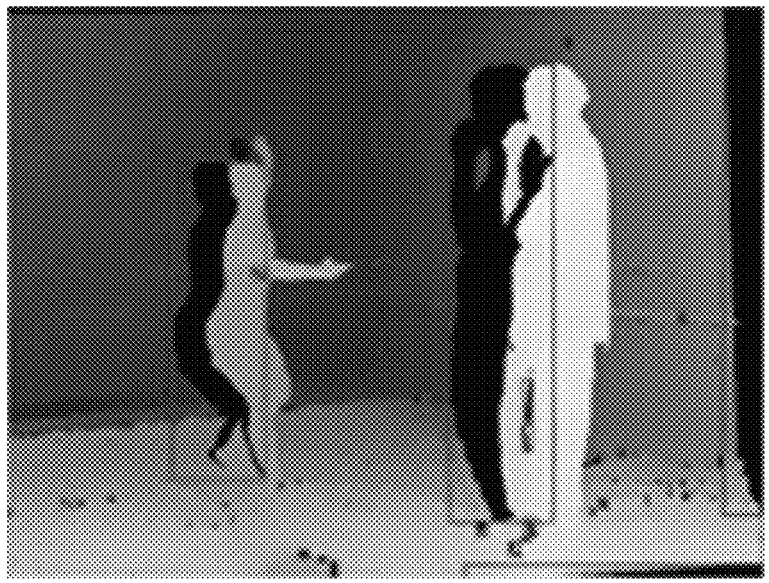
FIGS. 10A-10C show an example of local background information extracted by the local background information extraction unit.
Figure 10B:
Figure 10C:
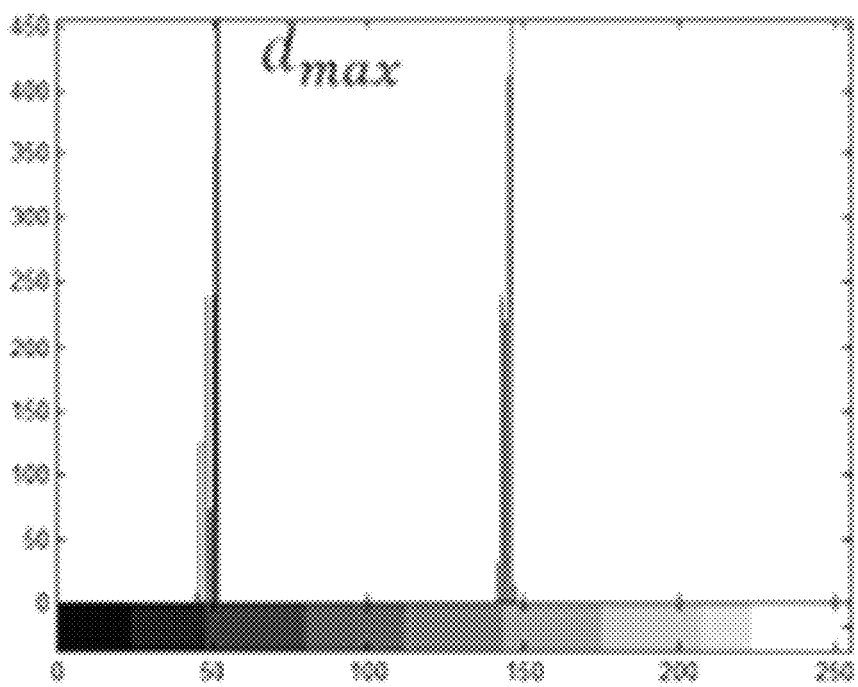

FIG. 7 shows an example of labeling a hole pixel area in the local background information extraction unit, FIG. 8 shows an algorithm used to label a hole pixel area in the local background information extraction unit, FIGS. 9A-9D show an example of a result of labeling a hole pixel area in the local background information extraction unit, and FIGS. 10A-10C show an example of local background information extracted by the local background information extraction unit.

Generally, hole-filling performance is sensitive to a hole-filling order and a hole-filling window size. Thus, the local background information extraction unit 20 may label hole pixels as shown in FIG. 7. In this case, the local background information extraction unit 20 applies a flood-fill method to label the hidden area formed in the virtual depth map $VM^t$. A labeling pseudo-code is the same as an algorithm of FIG. 8. In FIG. 8, S and Q denote queues, and "→" denotes an operator for taking out and removing a first element from a queue. As expressed in Equation 6 below, the local background information extraction unit 20 may define the smallest rectangular area including a k-th isolated hole area of the virtual depth map VMt according to the algorithm of FIG. 8.

$$\Omega_k \subset R_k.$$ [Equation 6]

As described above, the local background information extraction unit 20 may label a rectangular area including a hole area, which is depicted as a rectangle in FIGS. 9A-9D, included in the virtual depth map $VM^t$. Also, the local background information extraction unit 20 may identify a boundary area between background pixels and foreground pixels of the virtual depth map $VM^t$ to extract spatial local background information by dividing the labeled rectangular area into small rectangular areas (hereinafter referred to as sub-rectangular areas).

In detail, first, the local background information extraction unit 20 may divide the labeled rectangular area into the sub-rectangular areas in the virtual depth map $VM^t$. For example, the sub-rectangular areas of a k-th labeled rectangular area $R_k$ with a size of M×N may be defined as in Equation 7 below.

$$R_k = CR_{k,1} \cup \ldots \cup CR_{k,z},$$

$$CR_{k,1} \cap \ldots \cap CR_{k,z} = \emptyset$$ [Equation 7]

In Equation 7, the size of each of sub-rectangular areas $CR_{k,1}, \ldots, CR_{k,z}$ may be determined as Mx(N/z).

The local background information extraction unit 20 may acquire two clusters as expressed in Equation 8 below by applying a k-means cluster algorithm (k=2) to pixels other than hole pixels among the sub-rectangular areas.

$$CR_l = CR_{k,l,low} \cup CR_{k,l,high},$$

$$CR_{k,1} \cap \ldots \cap CR_{k,z} = \emptyset$$ [Equation 8]

In Equation 8, $CR_{k,l,low}$ and $CR_{k,l,high}$ denote a low depth cluster and a high depth cluster in each of the sub-rectangular areas $CR_{K,l}, \ldots, CR_{k,z}$. In this case, the maximum value of the low depth cluster $CR_{k,l,low}$ may be defined as in Equation 9, and may be used as a depth value of a local background.

$$d_{k,l,max} = \max\{d_m | d_m \in CR_{k,l,low}\}.$$ [Equation 9]

Lastly, the local background information extraction unit 20 may extract local background information $VM^t_{filled}$ by filling pixels of a depth map $VM^t$ that satisfies conditions of Equation 10 below with the maximum value of the low depth cluster acquired through Equation 9.

$$VM^t_{filled}(i, j) = \begin{cases} d_{k,l,max} & \text{if } T_s(i, j) = \text{True} \\ VM^t(i, j) & \text{otherwise} \end{cases}$$ [Equation 10]

$$T_s(i, j) = ((VM^t(i, j) \in CR_{k,l,low}) \wedge (VM^t(i, j) = 0)).$$

As described above, the local background information extraction unit 20 may extract the local background information by labeling a rectangular area including the hole area included in the virtual depth map $VM^t$, identifying background pixels and foreground pixels according to depth information of the rectangular area to acquire a local background depth value, and filling an area identified as the foreground pixels of the rectangular area with the local background depth value.

FIG. 10A shows an example indicating a virtual depth map of hole pixels that are grouped as the low depth cluster and the high depth cluster, FIG. 10B shows an example of extracting local background information, and FIG. 10C shows an example of a histogram of sub-rectangular areas. For example, the local background information extraction unit 20 may extract local background information as shown in FIG. 10B by clustering hole pixels as shown in FIG. 10A on the basis of depth information of the sub-rectangular areas as shown in FIG. 10C.

The hole-filling unit 30 may perform primary hole-filling on the virtual image $VF^t$ using similarity between the virtual static background depth map $VM^t_{BG}$ extracted by the static background information extraction unit 10 and the local background information $VM^t_{filled}$ extracted by the local background information extraction unit 20, and perform secondary hole-filling in an exemplar-based in-painting method in which a priority function including a depth term is applied to the remaining holes after the primary hole-filling.

In detail, the hole-filling unit 30 may update the virtual image $VF^t$ using the virtual static background image $VF^t_{BG}$ according to the similarity between the virtual static background depth map $VM^t_{BG}$ and the local background information $VM^t_{filled}$ as expressed in Equation 11 below, and may also update the virtual depth map $VM^t$ using the virtual static background depth map $VM^t_{BG}$ as expressed in Equation 12 below.

$$VF^t_{update}(i, j) = \begin{cases} VF^t_{BG}(i, j) & \text{if } A \leq VM^t_{BG} \leq B \\ VF^t(i, j) & \text{otherwise} \end{cases},$$ [Equation 11]

$$VM^t_{update}(i, j) = \begin{cases} VM^t_{BG}(i, j) & \text{if } A \leq VM^t_{BG} \leq B \\ VM^t(i, j) & \text{otherwise} \end{cases},$$ [Equation 12]

In Equations 11 and 12, A and B may be defined as $VM^t_{filled}$ (i, j)−T and $VM^t_{filled}$ (i, j)+T, respectively, and T denotes a positive threshold.

As described above, the hole-filling unit 30 may perform hole-filling on the hole area included in the virtual depth map $VM^t$ by updating background pixels of the virtual image $VF^t$ using pixels of the virtual static background image $VF^t_{BG}$ corresponding to pixels of the virtual static background depth map $VM^t_{BG}$ positioned within a certain range from the local background information $VM^t_{filled}$. In this case, according to Equations 11 and 12, the number of pixels of the virtual static background image $VF^t_{BG}$ that are not updated to the background pixels of the virtual image $VF^t$ increases as T decreases.

Though the background pixels of the virtual image $VF^t$ are updated using the pixels of the virtual static background image $VF^t_{BG}$, a plurality of hole pixels remain in the virtual image $VF^t$. Accordingly, the hole-filling unit 30 may perform hole-filling on the hole pixels remaining in the updated virtual image $VF^t_{update}$ in the exemplar-based in-painting method. Also, the hole-filling unit 30 may enhance a visual quality of a virtual image by initializing the hole pixels remaining in the updated virtual image $VF^t_{update}$ using a median predictor before applying the exemplar-based in-painting method. However, since a foreground area includes a plurality of dynamic areas, values estimated by the median predictor may be applied only to a background pixel area. Accordingly, the hole-filling unit 30 may perform a process of identifying a boundary between the background area and the foreground area on the hole pixels remaining in the updated virtual image $VF^t_{update}$ and then perform hole-filling on the remaining hole pixels in the exemplar-based in-painting method. This will be described with reference to FIGS. 11A to 14.

Figure 11A:
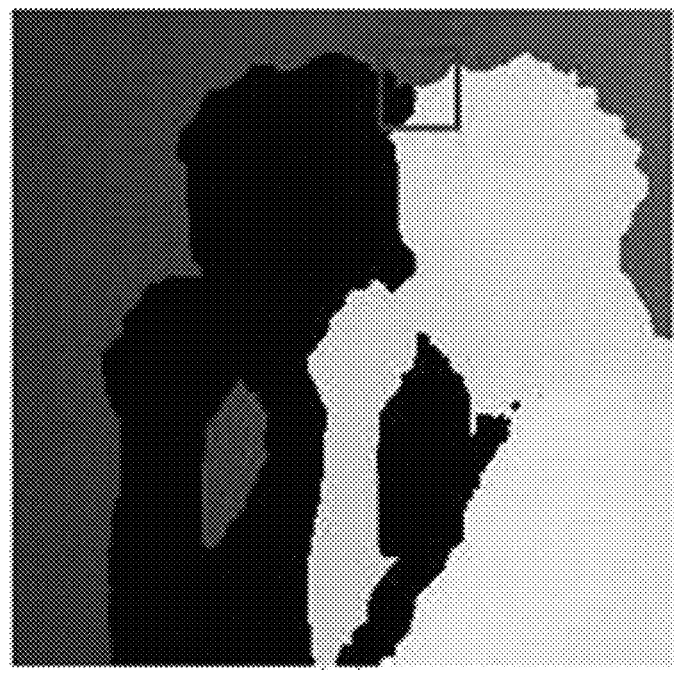
FIGS. 11A and 11B are diagrams for describing a hole-filling unit estimating a local background threshold.
Figure 11B:
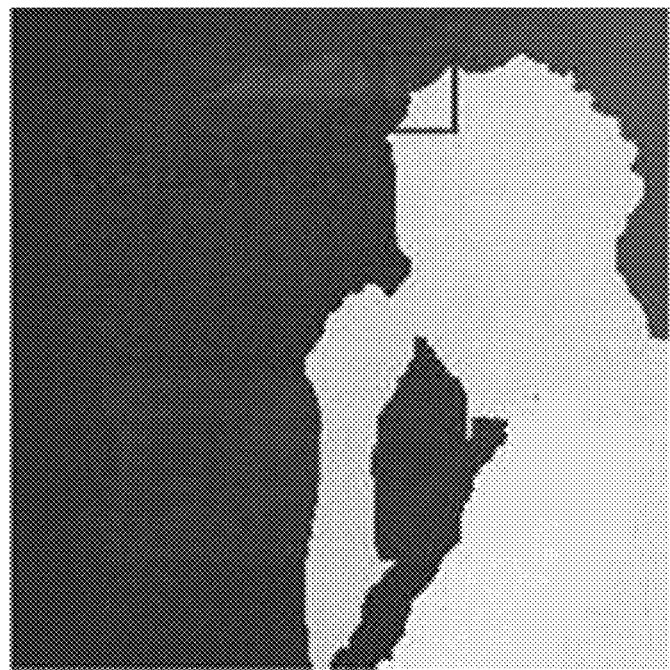

FIGS. 11A and 11B are diagrams for describing a hole-filling unit estimating a local background threshold, and FIG. 12 shows an algorithm used by the hole-filling unit to perform secondary hole-filling.

In detail, in order to identify a boundary between the background area and the foreground area of each of the hole pixels remaining in the updated virtual image $VF^t_{update}$, the hole-filling unit 30 may set a window $\Psi_d$ (which is displayed in a rectangular area) having a size of U×V and having $VM^t_{update}(m, n)$, which is a hole pixel remaining in the updated virtual image $VF^t_{update}$ as shown in FIG. 11A, and $VM^t_{filled}(m, n)$, which is a hole pixel of the corresponding local background information $VM^t_{filled}$ as shown in FIG. 11B, and my determine a background threshold using Equation 13 below.

$$Thr(\Psi_d) = \max(VM_{filled}^t(m,n) \in \Psi_d). \quad \text{[Equation 13]}$$

Equation 13 may be applied when $VM^t_{update}(m, n)=0$. According to Equation 13, hole pixels smaller than a value of $Thr(\Psi_d)$ among hole pixels in the window $\Psi_d$ of the local background information $VM^t_{filled}$ may be regarded as the background pixels.

The hole-filling unit 30 may apply the median predictor in consideration of the window $\Psi_p$ with the size of U×V, which has $VM^t_{update}(m, n)$ as a central pixel. In this case, in order to calculate a useful media prediction value, the hole-filling unit 30 may apply only pixels that are not holes in the window $\Psi_p$ of the updated virtual image $VF^t_{update}$ as elements of a median filter.

$$T_6 = (VM_{filled}^t(m,n) \neq 0) \char`\^ (VM_{filled}^t(m,n) \leq Thr(\psi_d)), \quad \text{[Equation 14]}$$

In Equation 14, when $T_6$=True, an initial background value for hole pixels present in an estimated background area of the window $\Psi_p$ of the updated virtual image $VF^t_{update}$ may be determined as in Equation 15 below.

$$BG_{\psi_p} = \text{median}(VF_{update}^t(m,n) \in \psi_p), \quad \text{[Equation 15]}$$

In Equation 15, median is a median function that chooses a median of an arrangement.

In addition, the hole-filling unit 30 may determine an initial virtual image for applying the exemplar-based in-painting method as expressed in Equation 16 below, on the basis of Equation 15.

$$VF_{init}^t(m, n) = \begin{cases} BG_{\psi_p} & \text{if } VM_{update}^t(m, n) = 0 \\ VF_{update}^t(m, n) & \text{otherwise} \end{cases}, \quad \text{[Equation 16]}$$

In Equation 16, $VF_{init}^t(m,n) \in \psi_p$.

As described above, the hole-filling unit 30 may extract valid background information from adjacent pixels that are not holes in the updated virtual image $VF^t_{update}$ according to Equations 14 to 16.

The hole-filling unit 30 may label the hole pixels of the updated virtual image $VF^t_{update}$ according to the algorithm of FIG. 7 in order to determine the order in which hole pixels are filled in the exemplar-based in-painting method and may perform a hole-filling process according to the exemplar-based in-painting method while moving from the smallest hole area to the largest hole area according to the labeling result. In this case, the hole-filling unit 30 may perform an exemplar-based hole-filling process in which a priority function is applied in a labeled hole area F according to the algorithm of FIG. 12. C(p), D(p), and Z(d) that determine a priority function Pri(p) in FIG. 12 denote a confidence term, a data term, and a depth term, respectively, which may be defined as in Equations 17 to 19.

$$C(p) = \frac{|\Phi|}{|\psi_p|} \quad \text{[Equation 17]}$$

In Equation 17, $|\Psi_p|$ denotes an area of the window $\Psi_p$ of the updated virtual area $VF^t_{update}$, and $|\Phi|$ denotes an area of pixels that are not holes in the window area. According to Equation 17, the confidence term C(p) increases as the number of pixels that are not holes in the area of the window $\Psi_p$ increases.

$$D(p) = \frac{\langle \nabla F_p^\perp, n_p \rangle}{\lambda}, \quad \text{[Equation 18]}$$

In Equation 18, $\lambda$ denotes a normalization factor and may be set as $\lambda=(2^n-1)$ when one pixel is typically represented by n bits. In addition, $n_p$ denotes a normal unit vector perpendicular to $\delta\Omega$, and $\nabla F_p^\perp$ denotes an outline (an isophote) having the same brightness as the center of the window $\Psi_p$ of the updated virtual image $VF^t_{update}$. According to Equation 18, when $\nabla F_p^\perp$ and $n_p$ have the same direction, the data term D(p) has the largest value.

$$Z(d) = \begin{cases} 1 & \text{if } d \leq Thr(\Psi_d), d \in \Psi_d \subset VM_{filled}^t \\ 0 & \text{otherwise} \end{cases}. \quad \text{[Equation 19]}$$

In this case, the hole-filling unit 30 may start to perform the hole-filling process on the background pixels and minimize geometric distortion by performing an exemplar-based hole-filling process on the basis of the priority function Pri(p) including the depth term D(p). In addition, according to FIG. 12, in step 3, $VF^t_{init}$ is used to find the most similar reference patch. This is because $VF^t_{init}$ supports more reliable information than $VF^t_{update}$ in order to minimize an energy function. In addition, a reference patch having a larger depth value than the local background threshold may be removed to reduce computational burden when an optimal corresponding reference patch is found.

Figure 13:
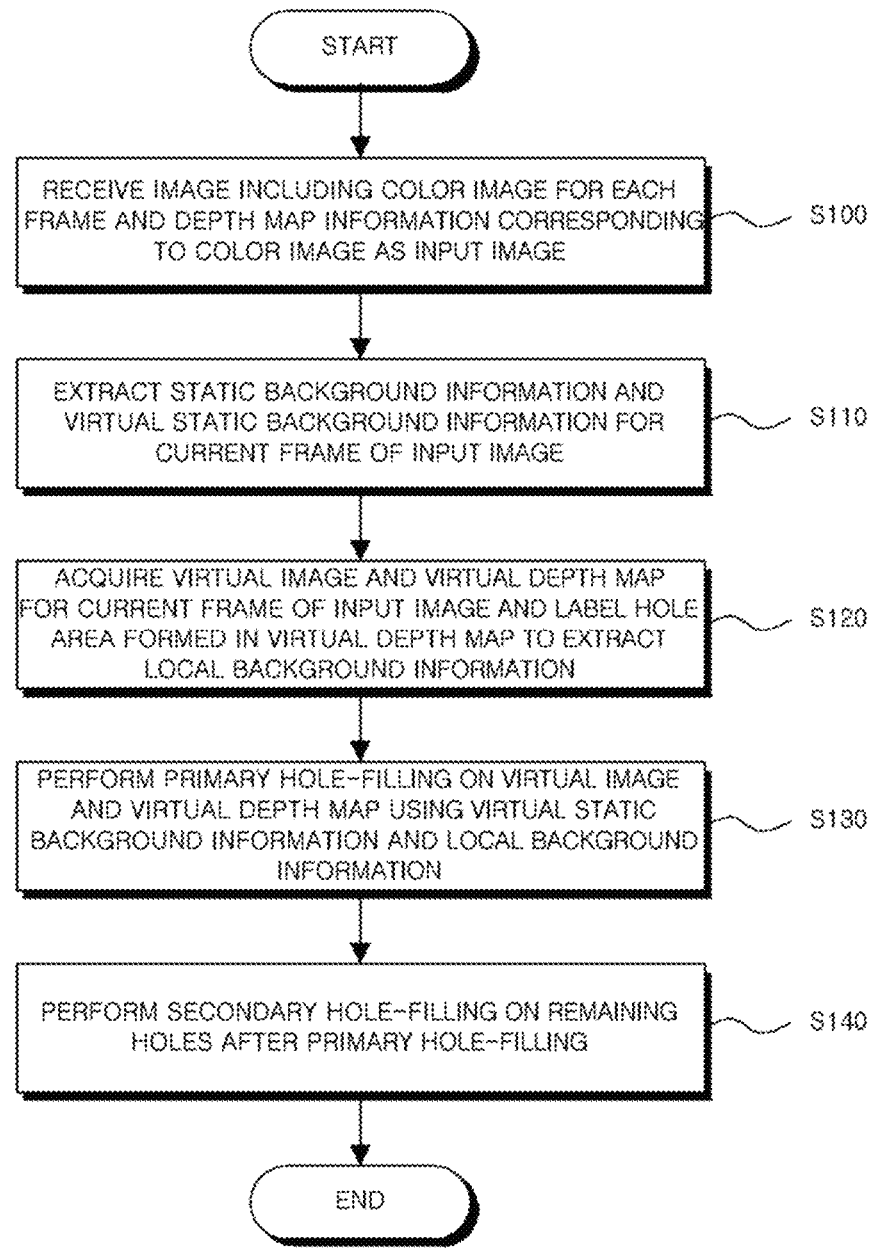
FIG. 13 is a flowchart of a method for hole-filling in 3D models according to an embodiment of the present disclosure.

A method for hole-filling in 3D models according to an embodiment of the present disclosure will be described below with reference to FIG. 13. FIG. 13 is a flowchart of a method for hole-filling in 3D models according to an embodiment of the present disclosure.

The method for hole-filling in 3D models according to an embodiment of the present disclosure may be performed using substantially the same configuration as the apparatus for hole-filing in 3D models 1 shown in FIG. 1. Accordingly, the same elements as the apparatus for hole-filing in 3D models 1 of FIG. 1 are assigned the same reference numerals, and detailed descriptions thereof will be omitted.

Referring to FIG. 13, the method for hole-filling in 3D models according to an embodiment of the present disclosure may receive an image including a color image for each frame and depth map information corresponding to the color image as an input image (S100).

Then, the static background information extraction unit 10 may extract static background information for the current frame of the input image and virtual static background information (S110).

In detail, the static background information extraction unit 10 may generate a codebook $C^t$ using a color image $F^t$ for each frame of the input image and depth map information $M^t$ corresponding to the color image $F^t$. In this case, the apparatus for hole-filing in 3D models 1 according to an embodiment of the present disclosure may receive an image including the color image $F^t$ for each frame and the depth map information $M^t$ corresponding to the color image $F^t$ as the input image. In addition, the static background information extraction unit 10 may extract a background codebook $C^t_{BG}$ from the generated codebook $C^t$. Then, the static background information extraction unit 10 may extract background information including a background image and a background depth map for the current frame using the background codebook $C^t_{BG}$ as temporary background information $TF^t_{BG}$, $TM^t_{BG}$. Lastly, the static background information extraction unit 10 may extract static background information $F^t_{BG}$, $M^t_{BG}$ for the current frame by updating the temporary background information $TF^t_{BG}$, $TM^t_{BG}$ using background information of a preceding frame.

The local background information extraction unit 20 may acquire a virtual image and a virtual depth map for the current frame of the input image and label a hole area formed in the virtual depth map to extract local background information (S120).

In detail, the local background information extraction unit 20 may extract the local background information by labeling a rectangular area including the hole area included in the virtual depth map $VM^t$, identifying background pixels and foreground pixels according to depth information of the rectangular area to acquire a local background depth value, and filling an area identified as the foreground pixels of the rectangular area with the local background depth value.

In addition, the hole-filling unit 30 may perform primary hole-filling on the virtual image and the virtual depth map using the virtual static background information and the local background information (S130). Then, the hole-filling unit 30 may perform secondary hole-filling on the remaining pixels after the primary hole-filling (S140).

In detail, the hole-filling unit 30 may perform the primary hole-filling on a virtual image $VF^t$ using similarity between a virtual static background depth map $VM^t_{BG}$ extracted by the static background information extraction unit 10 and a local background information $VM^t_{filled}$ extracted by the local background information extraction unit 20, and perform the secondary hole-filling in an exemplar-based in-painting method in which a priority function including a depth term is applied to the remaining holes after the primary hole-filling.

According to one aspect of the present disclosure, it is possible to efficiently fill hole pixels formed in a virtual-viewpoint image by estimating reliable static background information and local background information and performing a hole-filling process on the basis of the estimation, and it is also possible to compose a virtual-viewpoint image in which visual distortion is minimized irrespective of properties or hole types of an input image by applying an exemplar-based in-painting method according to a priority function including a depth term to perform a hole-filling process on the remaining holes.

As described above, the method for hole-filling in 3D models may be implemented as an application or implemented in the form of program instructions that may be executed through various computer components and recorded on a computer-readable recording medium. The computer-readable recording medium may also include program instructions, data files, data structures, or combinations thereof.

The program instructions recorded on the computer-readable recording medium may be specially designed for the present disclosure or may be well known to those skilled in the art of software.

Examples of the computer-readable recording medium include a magnetic medium, such as a hard disk, a floppy disk, and a magnetic tape, an optical medium, such as a compact disc read-only memory (CD-ROM), a digital versatile disc (DVD), etc., a magneto-optical medium, such as a floptical disk, and a hardware device specially configured to store and perform program instructions, for example, a ROM, a random access memory (RAM), flash memory, etc.

Examples of the program instructions include machine codes made by, for example, a compiler, as well as high-level language codes executable by a computer, using an interpreter. The above exemplary hardware device may be configured to operate as one or more software modules in order to perform processing according to the present disclosure, and vice versa.

While the example embodiments of the present disclosure and their advantages have been described in detail, it should be understood that various changes, substitutions and alterations may be made herein without departing from the scope of the disclosure.

What is claimed is:

1. A method for hole-filing in three dimensional (3D) models, the method comprising:
   extracting static background from a current frame of an input frame and extracting virtual static background information using the static background information, wherein a step of the extracting the static background information comprises:
   generating a codebook with respect to each frame of the input image using the color image and the depth map information corresponding to the color image; classifying codewords of the codebook into a background codeword and a foreground codeword; and extracting a background codebook for a background area of the input image;
   extracting a background image from the current frame of the input image and a background depth map corresponding to the background image as temporary background information using the background codebook;
   extracting the static background information including a static background image and a static depth map of the current frame by updating the temporary background information using background information of preceding frames;
   warping a color image and a depth map of the current frame to acquire a virtual image and a virtual depth map, and labeling a hole area formed in the virtual depth map to extract local information;
   performing a first hole-filling onto the virtual image and the virtual depth map using a similarity between the virtual static background information and the local background information; and performing a second hole-filling with respect to remaining holes after the first hole-filling in a manner of an exemplar-based in-painting method to which a priority function including a depth term is applied.

2. The method of claim 1, wherein a step of the extracting the static background information comprises:

extracting the virtual static background information including a virtual static background image and a virtual static background depth map corresponding to the virtual static background image by warping the static background image and the static depth map.

3. The method of claim 1, wherein the labeling of a hole area formed in the virtual depth map to extract local background information comprises:

extracting the local background information by labeling a rectangular area including the hole area formed in the virtual depth map, obtaining a local background depth value by identifying a background pixel and a foreground pixel according to depth information of the label rectangular area, and filling an area identified as the foreground pixel of the rectangular area with the local background depth value.

4. The method of claim 1, wherein a step of the performing a first hole-filling comprises:

updating the virtual image and the virtual depth map using the virtual static background information corresponding to a pixel positioned within a predetermined range from a pixel corresponding to the local background information.

5. The method of claim 4, wherein a step of the performing a second hole-filling comprises:

labeling the remaining hole pixels in the updated virtual image and virtual depth map and performing the second hole-filling in the manner of the exemplar-based in-painting method while moving from a smallest hole area to a largest hole area according to a result of the labeling.

6. A non-transitory computer-readable recording medium having recorded thereon a computer program for performing a method for hole-filling in three dimensional (3D) models, the method comprising:

extracting static background information from a current frame of an input image and extracting virtual static background information using the static background information;

wherein a step of the extracting the static background information comprises:

generating a codebook with respect to each frame of the input image using the color image and the depth map information corresponding to the color image; classifying codewords of the codebook into a background codeword and a foreground codeword; and extracting a background codebook for a background area of the input image;

extracting a background image from the current frame of the input image and a background depth map corresponding to the background image as temporary background information using the background codebook;

extracting the static background information including a static background image and a static depth map of the current frame by updating the temporary background information using background information of preceding frames warping a color image and a depth map of the current frame to acquire a virtual image and a virtual depth map, and labeling a hole area formed in the virtual depth map to extract local background information;

performing a first hole-filling onto the virtual image and the virtual depth map using a similarity between the virtual static background information and the local background information; and performing a second hole-filling with respect to remaining holes after the first hole-filling in a manner of an exemplar-based in-painting method to which a priority function including a depth term is applied.

7. The non-transitory computer-readable recording medium of claim 6, wherein a step of the extracting the static background information comprises:

extracting the virtual static background information including a virtual static background image and a virtual static background depth map corresponding to the virtual static background image by warping the static background image and the static depth map.

8. The non-transitory computer-readable recording medium of claim 6, wherein the labeling of a hole area formed in the virtual depth map to extract local background information comprises:

extracting the local background information by labeling a rectangular area including the hole area formed in the virtual depth map, obtaining a local background depth value by identifying a background pixel and a foreground pixel according to depth information of the labeled rectangular area, and filling an area identified as the foreground pixel of the rectangular area with the local background depth value.

9. The non-transitory computer-readable recording medium of claim 6, where a step of the performing a first hole-filling comprises:

updating the virtual image and the virtual depth map using the virtual static background information corresponding to a pixel positioned within a predetermined range from a pixel corresponding to the local background information.

* * * * *